United States Patent
Watts et al.

(10) Patent No.: US 10,656,646 B2
(45) Date of Patent: May 19, 2020

(54) GROUND PLANE DETECTION TO VERIFY DEPTH SENSOR STATUS FOR ROBOT NAVIGATION

(71) Applicant: X Development LLC, Mountain View, CA (US)

(72) Inventors: Kevin William Watts, Palo Alto, CA (US); Kurt Konolige, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 228 days.

(21) Appl. No.: 15/841,605

(22) Filed: Dec. 14, 2017

(65) Prior Publication Data
US 2018/0107218 A1    Apr. 19, 2018

Related U.S. Application Data

(63) Continuation of application No. 14/828,445, filed on Aug. 17, 2015, now Pat. No. 9,886,035.

(51) Int. Cl.
*G05D 1/00* (2006.01)
*G05D 1/02* (2020.01)
(Continued)

(52) U.S. Cl.
CPC ......... *G05D 1/0088* (2013.01); *G05D 1/0251* (2013.01); *G05D 1/0276* (2013.01);
(Continued)

(58) Field of Classification Search
None
See application file for complete search history.

(56) References Cited

U.S. PATENT DOCUMENTS 7,068,815 B2    6/2006   Chang et al.
8,332,134 B2   12/2012   Zhang et al.
(Continued)

FOREIGN PATENT DOCUMENTS

EP    2775316    9/2014

OTHER PUBLICATIONS

Hedenberg, Klas, "Obstacle Detection for Driverless Trucks in Industrial Environments," Halmstad University Dissertations No. 7, Halmstad University Press, 2014, 92 pages.
(Continued)

*Primary Examiner* — Navid Ziaeianmehdizadeh
(74) *Attorney, Agent, or Firm* — McDonnell Boehnen Hulbert & Berghoff LLP

(57) ABSTRACT

An example method includes determining a target area of a ground plane in an environment of a mobile robotic device, where the target area of the ground plane is in front of the mobile robotic device in a direction of travel of the mobile robotic device. The method further includes receiving depth data from a depth sensor on the mobile robotic device. The method also includes identifying a portion of the depth data representative of the target area. The method additionally includes determining that the portion of the depth data lacks information representing at least one section of the target area. The method further includes providing an output signal identifying at least one zone of non-traversable space for the mobile robotic device in the environment, where the at least one zone of non-traversable space corresponds to the at least one section of the target area.

15 Claims, 14 Drawing Sheets

(51) Int. Cl.
   *G06K 9/00* (2006.01)
   *G01S 17/88* (2006.01)
(52) U.S. Cl.
   CPC .......... *G06K 9/00805* (2013.01); *G01S 17/88* (2013.01); *G05D 2201/0216* (2013.01)

(56) References Cited

U.S. PATENT DOCUMENTS

| | | |
|---|---|---|
| 8,442,714 B2 | 5/2013 | Matsukawa et al. |
| 8,594,844 B1 | 11/2013 | Gal |
| 8,880,273 B1 | 11/2014 | Chatham |
| 9,069,080 B2 | 6/2015 | Stettner et al. |
| 9,610,691 B2 | 4/2017 | Noh et al. |
| 2005/0131581 A1 | 6/2005 | Sabe et al. |
| 2006/0025888 A1 | 2/2006 | Gutmann et al. |
| 2006/0058921 A1 | 3/2006 | Okamoto |
| 2007/0156286 A1 | 7/2007 | Yamauchi |
| 2008/0027591 A1 | 1/2008 | Lenser et al. |
| 2009/0141938 A1 | 6/2009 | Lim et al. |
| 2010/0066587 A1 | 3/2010 | Yamauchi et al. |
| 2010/0222925 A1 | 9/2010 | Anezaki |
| 2012/0061155 A1 | 3/2012 | Berger et al. |
| 2012/0158178 A1 | 6/2012 | Hyung et al. |
| 2012/0215380 A1 | 8/2012 | Fouillade et al. |
| 2013/0226344 A1 | 8/2013 | Wong et al. |
| 2013/0231779 A1 | 9/2013 | Purkayastha et al. |
| 2013/0343640 A1 | 12/2013 | Buehler et al. |
| 2014/0324270 A1 | 10/2014 | Chan et al. |
| 2014/0350839 A1 | 11/2014 | Pack et al. |
| 2015/0190925 A1 | 7/2015 | Hoffman et al. |
| 2015/0328775 A1 | 11/2015 | Shamlian et al. |
| 2015/0362921 A1 | 12/2015 | Hanaoka et al. |
| 2016/0016315 A1 | 1/2016 | Kuffner, Jr. et al. |
| 2016/0075026 A1 | 3/2016 | Sisbot et al. |
| 2016/0378117 A1* | 12/2016 | Szatmary ............ B25J 5/00 382/153 |

OTHER PUBLICATIONS

Kumar et al., "Sensor Fusion of Laser & Stereo Vision Camera for Depth Estimation and Obstacle Avoidance," International Journal of Computer Applications (0975-8887), 2010, pp. 22-27, vol. 1, No. 26.

* cited by examiner

300

302 Determine a target area of a ground plane in an environment of a mobile robotic device, where the mobile robotic device is travelling on the ground plane in the environment and the target area of the ground plane is in front of the mobile robotic device in a direction of travel of the mobile robotic device

304 Receive depth data from a depth sensor on the mobile robotic device, wherein the depth data is indicative of the environment of the mobile robotic device in the direction of travel of the mobile robotic device

306 Identify a portion of the depth data representative of the target area of the ground plane in the environment in front of the mobile robotic device

308 Determine that the portion of the depth data lacks information representing at least one section of the target area of the ground plane in the environment in front of the mobile robotic device

310 Provide an output signal identifying at least one zone of non-traversable space for the mobile robotic device in the environment, where the at least one zone of non-traversable space corresponds to the at least one section of the target area of the ground plane in the environment in front of the mobile robotic device

FIG. 3

GROUND PLANE DETECTION TO VERIFY DEPTH SENSOR STATUS FOR ROBOT NAVIGATION

CROSS-REFERENCE TO RELATED APPLICATION

The present disclosure is a continuation of U.S. patent application Ser. No. 14/828,445, filed on Aug. 17, 2015, and entitled "Ground Plane Detection to Verify Depth Sensor Status for Robot Navigation," the entire contents of which are herein incorporated by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may help to verify the status of a depth sensor such as a stereo camera for use in mobile robot navigation. A target area of a ground plane in front of the mobile robot may first be determined. For instance, the target area may extend from a first distance to a second distance in front of the mobile robot, and may have a width greater than the width of the robot. Depth data may be received from a depth sensor on the robot and processed to identify a portion corresponding to an expected location of the target area on the ground plane. In some cases, it may be determined that the depth data lacks information representing a section of the target area. A zone of non-traversable space for the mobile robot may then be determined corresponding to the section that is not visible by the depth sensor.

In one example, a method is provided that includes determining a target area of a ground plane in an environment of a mobile robotic device, where the mobile robotic device is travelling on the ground plane in the environment and the target area of the ground plane is in front of the mobile robotic device in a direction of travel of the mobile robotic device. The method further includes receiving depth data from a depth sensor on the mobile robotic device, where the depth data is indicative of the environment of the mobile robotic device in the direction of travel of the mobile robotic device. The method also includes identifying a portion of the depth data representative of the target area of the ground plane in the environment in front of the mobile robotic device. The method additionally includes determining that the portion of the depth data lacks information representing at least one section of the target area of the ground plane in the environment in front of the mobile robotic device. The method further includes providing an output signal identifying at least one zone of non-traversable space for the mobile robotic device in the environment, where the at least one zone of non-traversable space corresponds to the at least one section of the target area of the ground plane in the environment in front of the mobile robotic device.

In another example, a mobile robotic device is provided that includes a depth sensor on the mobile robotic device and a control system. The control system may be configured to determine a target area of a ground plane in an environment of the mobile robotic device, where the mobile robotic device is travelling on the ground plane in the environment and the target area of the ground plane is in front of the mobile robotic device in a direction of travel of the mobile robotic device. The control system may be configured to receive depth data from the depth sensor on the mobile robotic device, wherein the depth data is indicative of the environment of the mobile robotic device in the direction of travel of the mobile robotic device. The control system may be configured to identify a portion of the depth data representative of the target area of the ground plane in the environment in front of the mobile robotic device. The control system may additionally be configured to determine that the portion of the depth data lacks information representing at least one section of the target area of the ground plane in the environment in front of the mobile robotic device. The control system may also be configured to provide an output signal identifying at least one zone of non-traversable space for the mobile robotic device in the environment, where the at least one zone of non-traversable space corresponds to the at least one section of the target area of the ground plane in the environment in front of the mobile robotic device.

In another example, a non-transitory computer readable medium is provided having stored therein instructions, that when executed by a control system of a mobile robotic device, cause the control system to perform functions. The functions include determining a target area of a ground plane in an environment of the mobile robotic device, where the mobile robotic device is travelling on the ground plane in the environment and the target area of the ground plane is in front of the mobile robotic device in a direction of travel of the mobile robotic device. The functions also include receiving depth data from a depth sensor on the mobile robotic device, where the depth data is indicative of the environment of the mobile robotic device in the direction of travel of the mobile robotic device. The functions additionally include identifying a portion of the depth data representative of the target area of the ground plane in the environment in front of the mobile robotic device. The functions further include determining that the portion of the depth data lacks information representing at least one section of the target area of the ground plane in the environment in front of the mobile robotic device. The functions additionally include providing an output signal identifying at least one zone of non-traversable space for the mobile robotic device in the environment, where the at least one zone of non-traversable space corresponds to the at least one section of the target area of the ground plane in the environment in front of the mobile robotic device.

In a further example, a system is provided that includes means for determining a target area of a ground plane in an environment of the mobile robotic device, where the mobile robotic device is travelling on the ground plane in the environment and the target area of the ground plane is in front of the mobile robotic device in a direction of travel of the mobile robotic device. The system also includes means for receiving depth data from a depth sensor on the mobile robotic device, where the depth data is indicative of the environment of the mobile robotic device in the direction of travel of the mobile robotic device. The system additionally includes means for identifying a portion of the depth data representative of the target area of the ground plane in the environment in front of the mobile robotic device. The system further includes means for determining that the portion of the depth data lacks information representing at least one section of the target area of the ground plane in the environment in front of the mobile robotic device. The system additionally includes means for providing an output signal identifying at least one zone of non-traversable space for the mobile robotic device in the environment, where the at least one zone of non-traversable space corresponds to the at least one section of the target area of the ground plane in the environment in front of the mobile robotic device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3 is a block diagram of a method, according to an example embodiment.

DETAILED DESCRIPTION

Figure 1A:
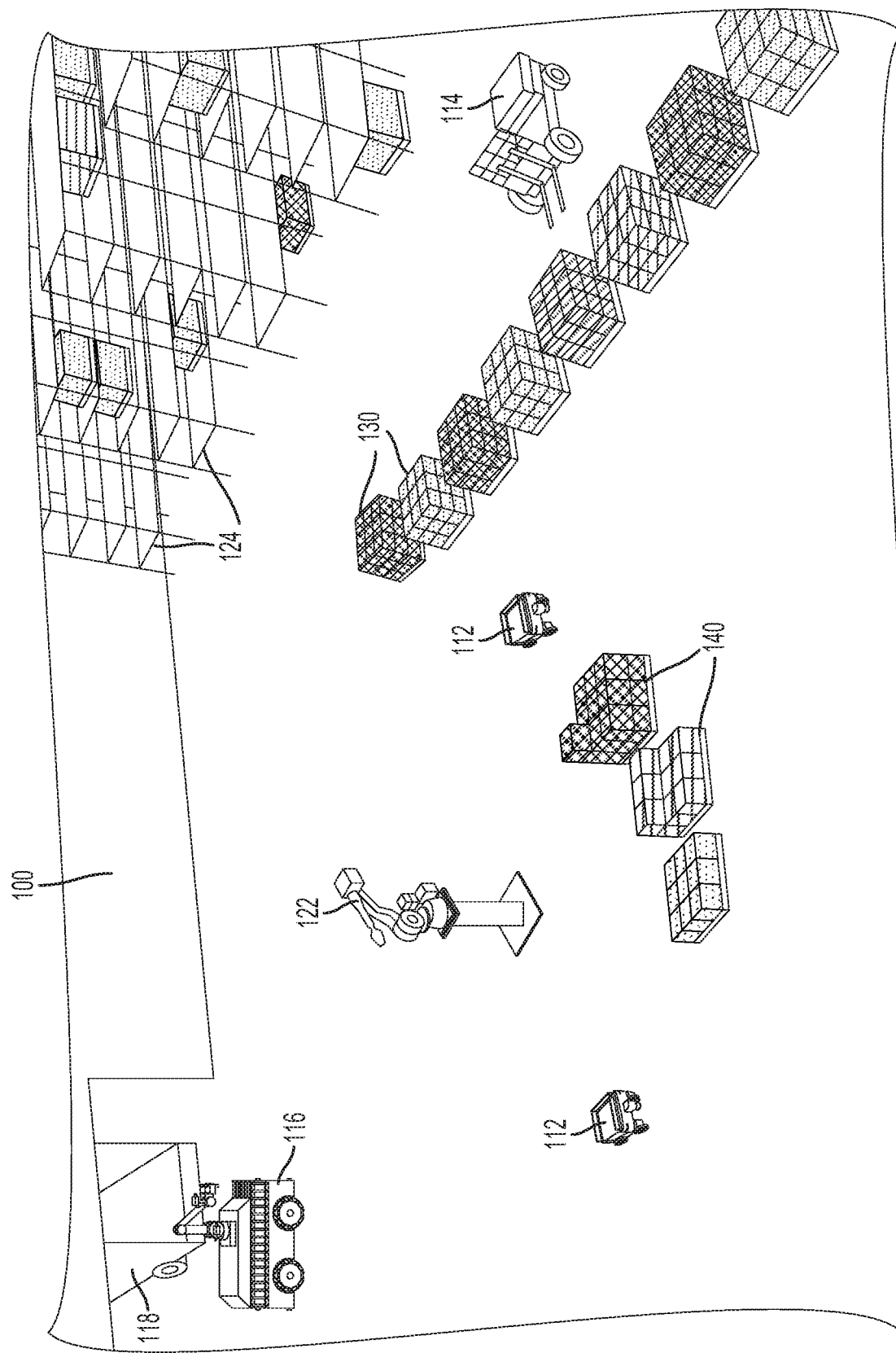
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Mobile robotic devices such as AGVs (Autonomous Guided Vehicles) may be required to detect obstacles when moving. Various regulations for robotic devices exist, and the sensors for obstacle detection used may be "safety rated" or "safety guaranteed." The safety rating process proscribes a number of requirements on detectable objects and redundancy. Some AGV safety systems currently use planar LIDAR sensors to perform this obstacle detection function. Because they only see a single plane, these sensors don't always see overhanging obstacles or small obstacles on the floor. Detecting obstacles such as tables and chairs may be particularly problematic for these sensors. Due to the relatively high cost and poor performance of these sensors, it may be advantageous to use other depth sensors such as stereo sensors as safety sensors for mobile robots.

A stereo sensor uses at least two optical elements to measure the distance to objects in a scene. Images from each optical element are correlated to find possible matches in the scene. After matches are determined, the distance to objects may be calculated. Within examples, this correlation matching can fail for several reasons, including the amount of ambient light in the environment (e.g., too dark or too light), electrical and/or hardware failure of the stereo camera system, or lack of sufficient texture to resolve a correlation match. With any of these failures, a stereo algorithm may be unable to calculate any distance measurements for part (or all) of the surrounding environment. Additionally, stereo camera detection failures may not be distinguishable from an object at effectively infinite distances from the camera (e.g., the sky or a distant wall). Within examples, ground plane verification may be used in order to verify that a stereo camera system is providing accurate readings of the environment. Once a chosen target area of the ground plane in front of the AGV is verified, the stereo sensor may then be used as a safety sensor for the robot. Additionally, example ground plane verification methods may allow the AGV to verify that any infinite distances reported by the stereo camera system are actually aspects of the environment that are far away, and not detection failures that could result in a collision.

According to example embodiments, a particular target area of the ground plane on which a robot is traveling may be verified using predicted output of the robot's stereo camera system. In particular, assuming a stereo camera is mounted so that its field of view includes part of the ground plane in front of an AGV, the stereo camera should be able to identify an area of the ground plane extending in front of the AGV in the direction of travel of the vehicle. If the ground plane detection is missing (either partially or fully) from stereo sensor data, it may be concluded that either that part or all of the ground plane is occluded by an obstacle, or that the stereo camera system is not currently functioning correctly. In either case, a zone of non-traversable space for the AGV may be identified corresponding to a missing section of ground plane (e.g., a section that is not identifiable within stereo sensor data). In some examples, a control system of the AGV may receive a warning signal from a safety system to stop, or to navigate around the non-traversable space.

Certain object detection systems for mobile robotic devices may use methods of ground plane subtraction. In such systems, any data from the ground is discarded, which may make it easier to identify obstacles. Methods of ground plane subtraction therefore may provide increased computational speed. However, such methods may not provide sufficient redundancy to allow a stereo sensor to be used as a safety sensor on a mobile robot, given that the stereo sensor may be prone to failures or false negatives. Within examples, verifying that a particular target area of the ground plane is continuously detected by a stereo camera makes the system robust to changes in ambient lighting as well as hardware failures of the camera. Once the system verifies that the stereo camera system has successfully detected the target area of the ground plane, the stereo camera system may then also be used to provide depth information for objects above ground within the environment of the robotic device as well.

In further examples, methods of ground plane verification may be used to verify the status of another type of depth sensor besides a stereo sensor that may also encounter failures or dropouts when for one reason or another, the depth sensor cannot get an accurate depth reading. For instance, the depth sensor could be a lidar sensor that may sometimes fail to detect shiny surfaces within the environment. In such an example, the lidar sensor may be oriented on a robot so that its range covers part of the ground in front of the robot in order to verify that collected depth data from the lidar sensor includes a target area of the ground plane.

In additional examples, a robotic device may also be equipped with a texture projector that projects a texture pattern toward the ground plane in front of the device. A stereo camera may then operate by detecting matching patterns in the projected texture patterns. The texture projector may allow a stereo sensor to be used as a safety sensor in environments where the ground lacks its own texture for stereo matching. In some examples, the system may also identify areas on the ground plane that the projected texture pattern failed to reach as corresponding to additional non-traversable zones for the robot.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
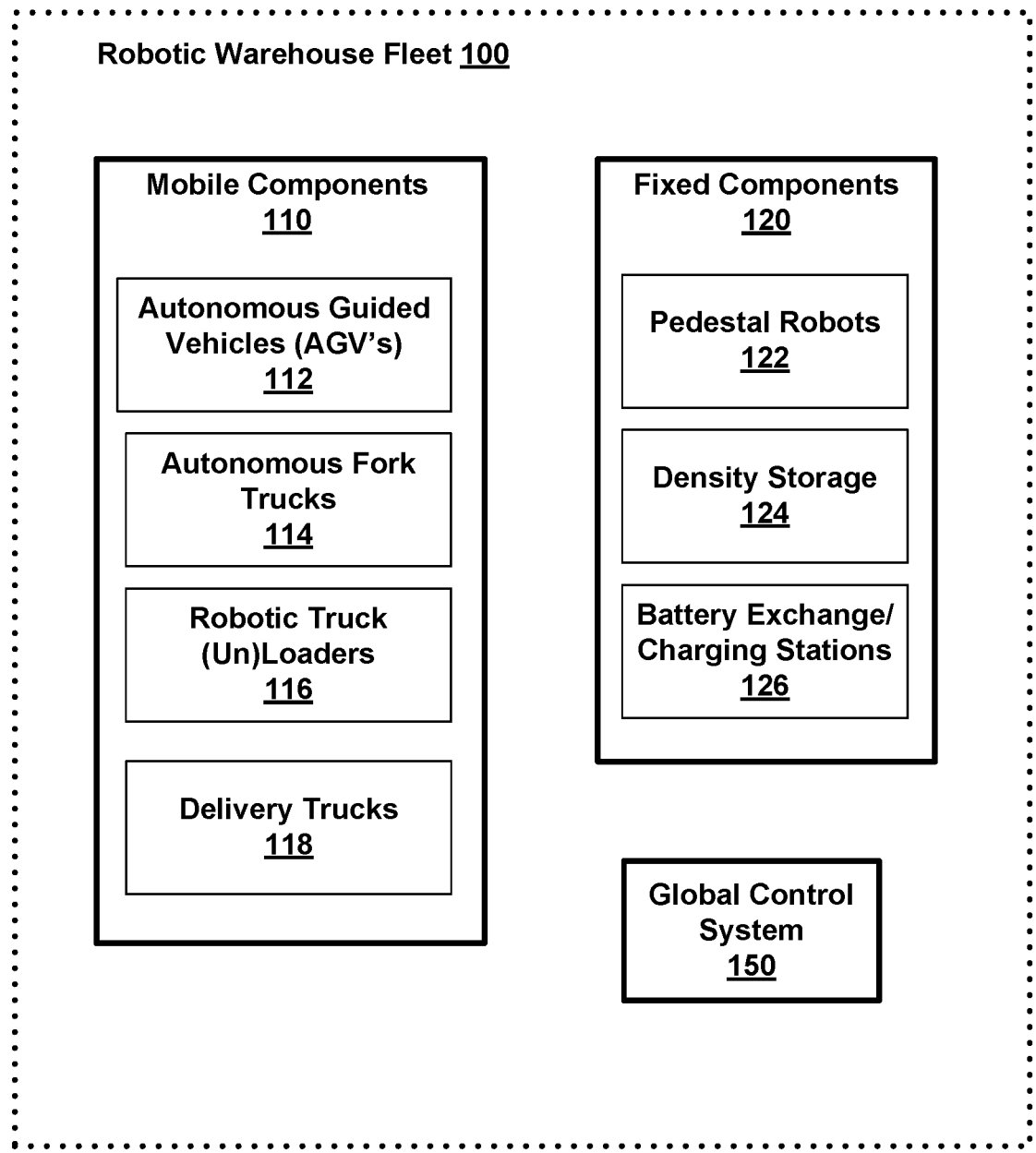
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
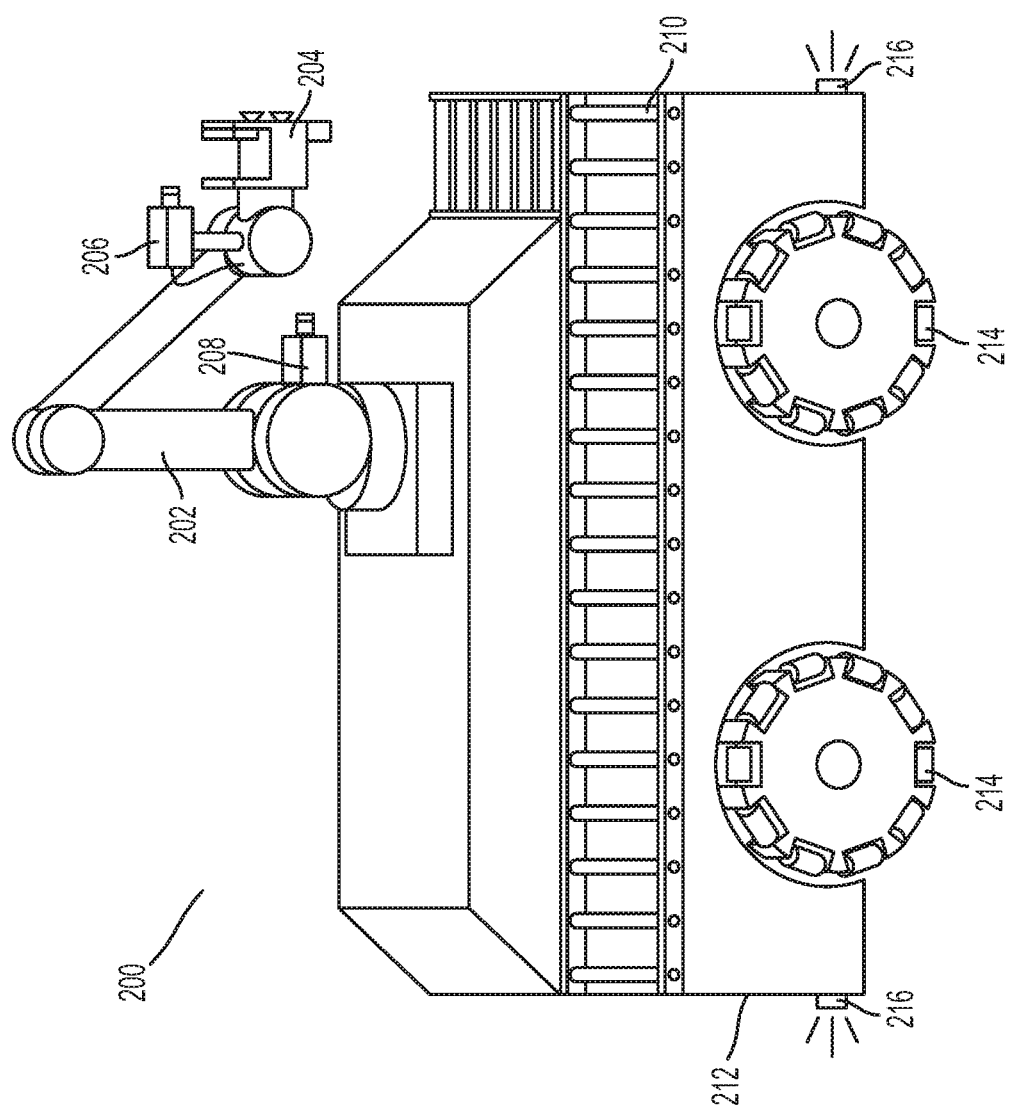
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a navigation sensors 216, safety sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
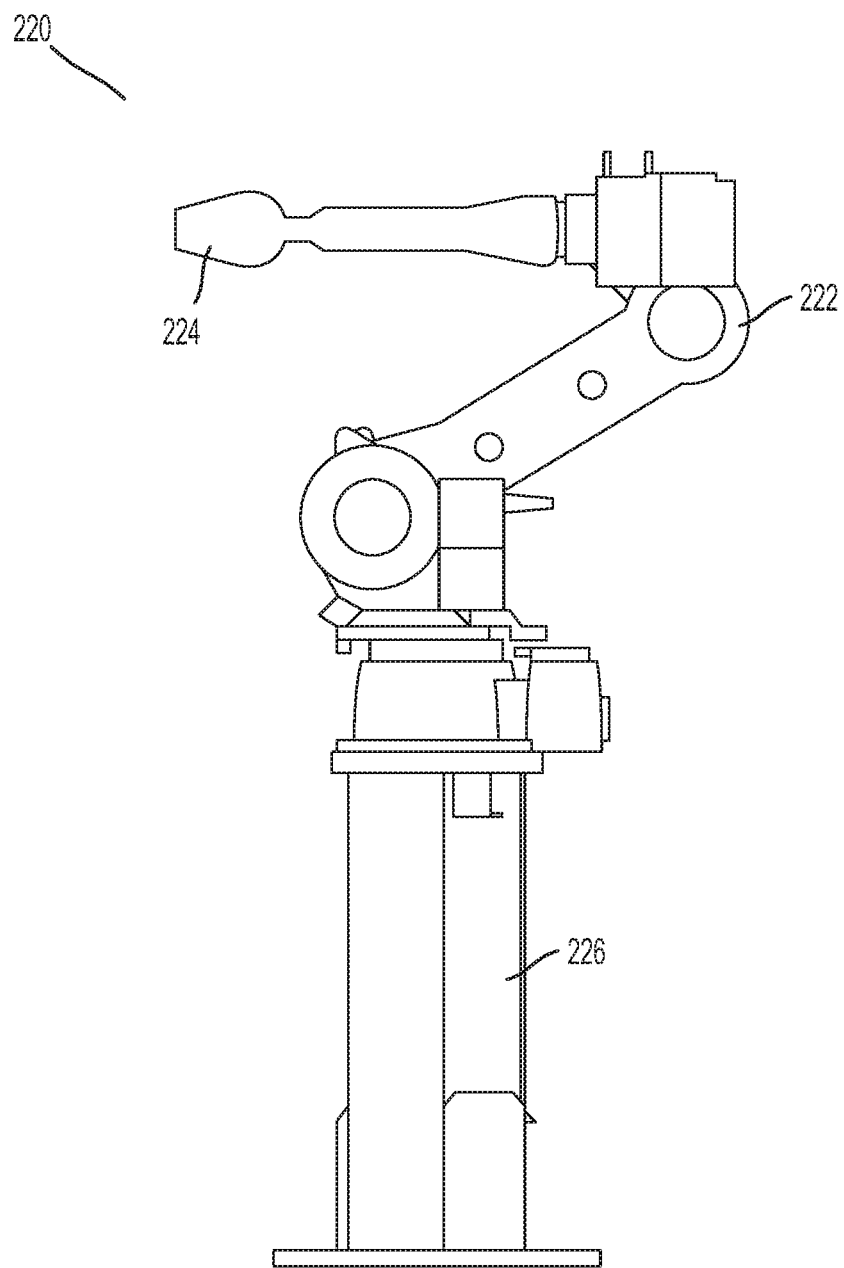
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
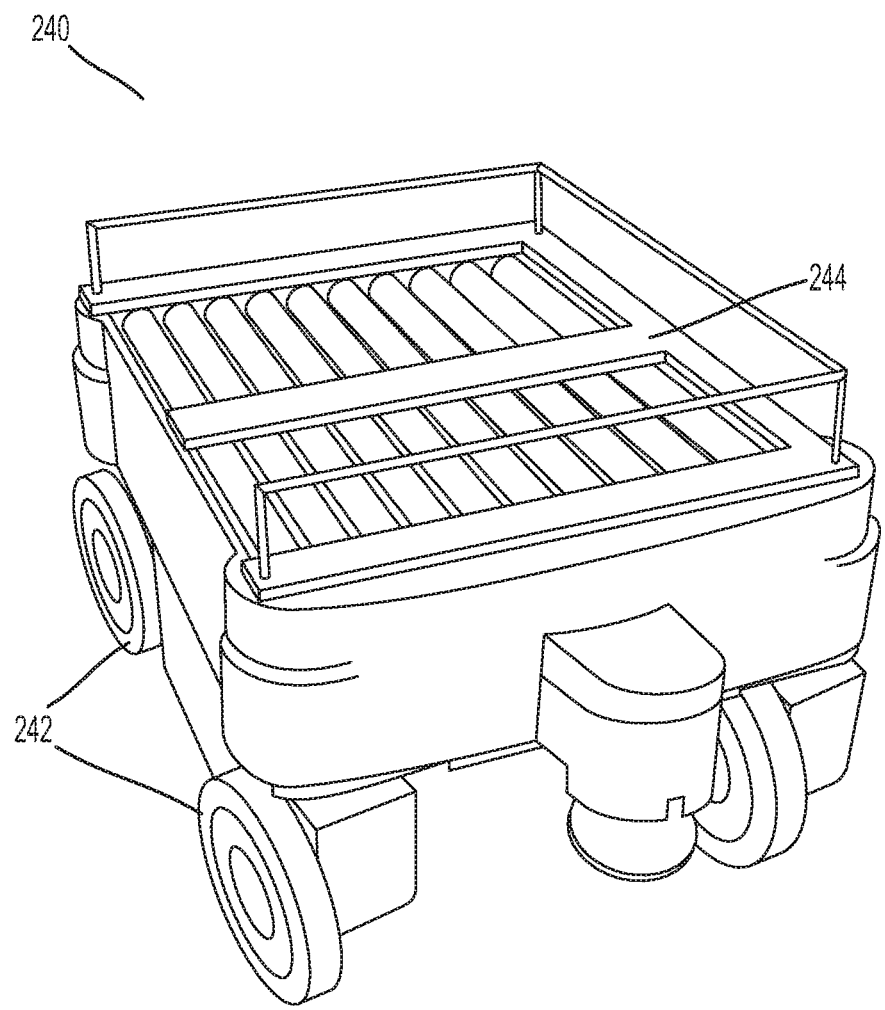
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
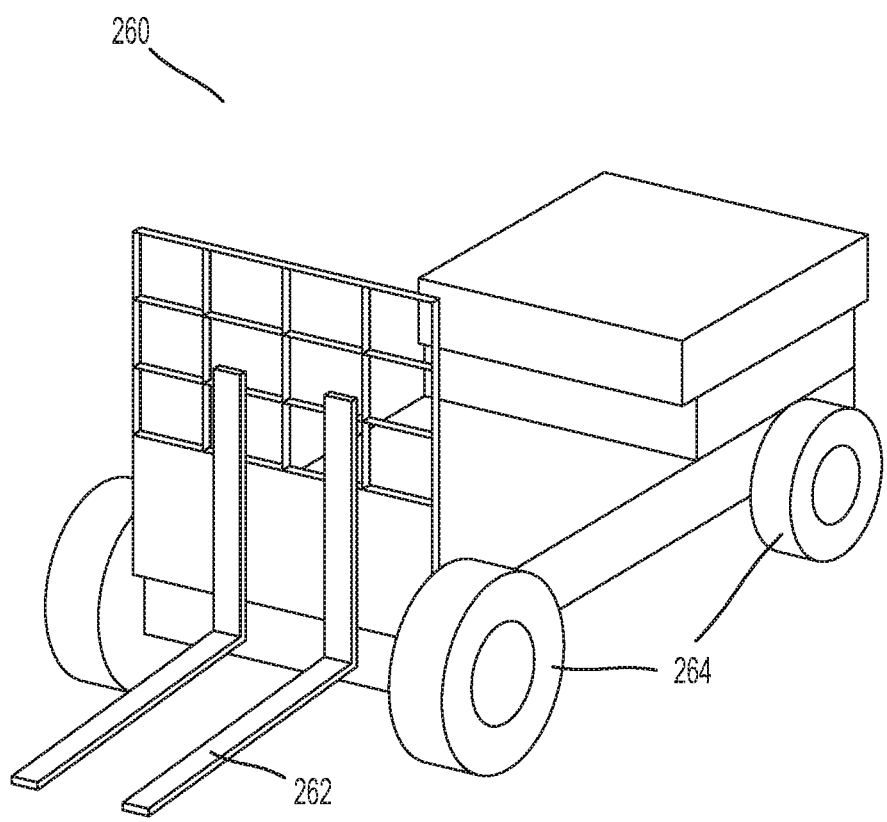
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

FIG. 3 illustrates a flowchart showing a method 300 that may be used to verify depth sensor status for use by a mobile robotic device, according to an example embodiment. Method 300 may be carried out by a safety system independent from a local control system of a robotic device. In other examples, method 300 may be carried out by a safety system integrated with a local control system of a robotic device. The robotic device may be any mobile robotic device or vehicle, such as the ones illustrated and described previously with respect to FIGS. 1A-1B and/or 2A-2D.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may involve determining a target area of a ground plane in an environment of a mobile robotic device, according to an example embodiment. More specifically, the ground plane is a surface on which the robotic device is moving within the environment. For instance, the ground plane may be a floor of a warehouse, and the robotic device may have a number of wheels moving along the floor of the warehouse. The robotic device could travel on the ground plane in other ways as well. For instance, the robotic device may be a biped robot that walks on the ground plane.

Within examples, the target area is a two-dimensional section of the ground plane in front of the robotic device in the direction of travel of the robotic device. The target area may be continuously or periodically determined for the robotic device based on the current location and direction of travel of the robotic device. The target area may represent a section of the ground plane for a robotic system to verify in order to proceed in its current direction of travel. The location of the target area may be adjusted based on the current position of the robotic device. In some examples, the size and shape of the target area may be constant. For instance, the target area may extend from one foot in front of the robot to twenty feet in front of the robot in the direction of travel of the robot. Additionally, the target area may have a width that is greater than the width of the robot, and the width of the target area may increase or fan out as the target area extends away from the robot. In further examples, the size and/or shape of the target area may be adjusted dynamically based on current motion parameters of the robot, such as speed and/or steering orientation.

Figure 4A:
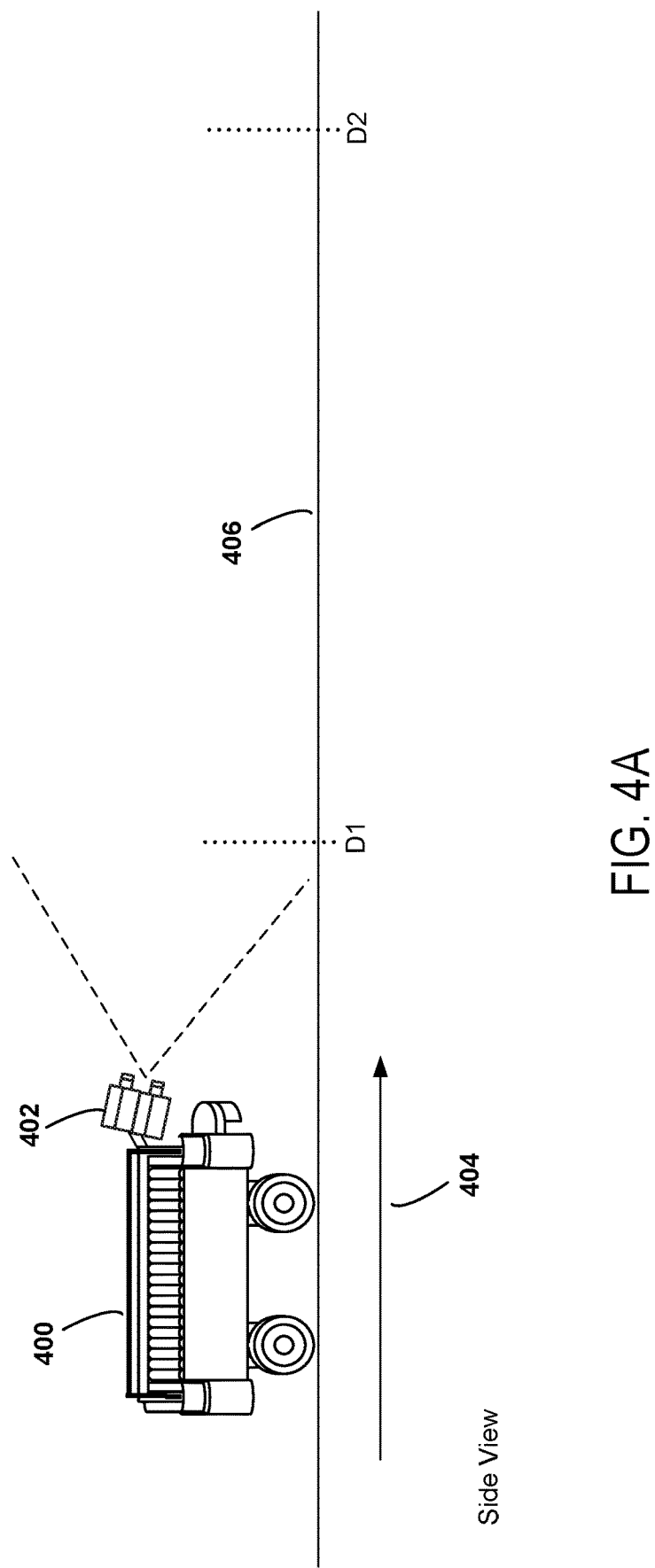
FIG. 4A is a side view of a robotic device, according to an example embodiment.

FIG. 4A illustrates a side view of a robotic device traveling within an environment, according to an example embodiment. More specifically, robotic device 400 may be an AGV traveling within an environment in a direction of travel 404. Further, robotic device 400 may be equipped with a stereo sensor 402 that is oriented to collect data indicative of the environment in front of the robot 400 in direction of travel 404. A target area 406 of the ground on which the robot 400 is travelling may be determined. As shown in FIG. 4A, the target area 406 may extend from a first distance D1 to a second distance D2 in front of robot 400 in the direction of travel 404. In some examples, the first distance D1 may be determined to be the minimum detectable range of stereo camera 402. The field of view of the stereo camera 402 may then extend from D1 in front of the robot 400. In additional examples, the second distance D2 may be determined to be a predetermined distance past D1 in direction of travel 404. In other examples, the second distance D2 may be determined based on the current speed of robot 400.

Figure 4B:
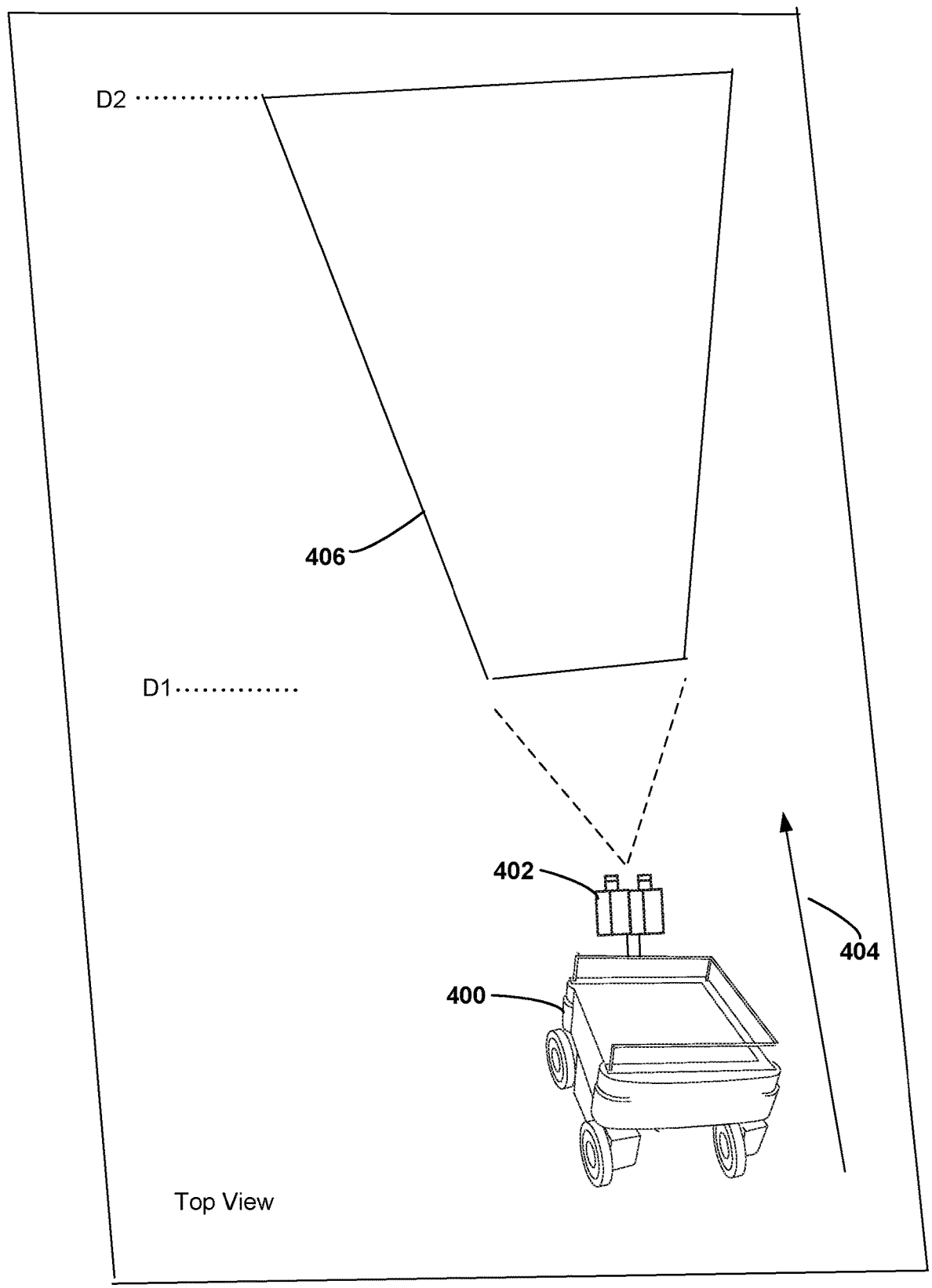
FIG. 4B is a top view of a robotic device, according to an example embodiment.

FIG. 4B illustrates a top view of the robotic device from FIG. 4A, according to an example embodiment. More specifically, the target area 406 is illustrated in FIG. 4B as a two-dimensional area in front of robot 400 in direction of travel 400. As shown here, the width of target area 406 may be greater than the width of robot 400, and may increase in the direction of travel 404. Increasing the width of target area 406 in direction of travel 404 may allow for verification of a portion of the ground plane that may be reached by robot 400 if the robot 400 changes steering orientation while moving in direction of travel 404. In other examples, the shape of target area 406 may depend on the current steering orientation of robot 400. For instance, if the robot 400 is turning to the left while moving, the target area 406 may be extended further to the left to allow for verification of a portion of the ground plane that may be reached by robot 400 as a result of the turn.

Referring back to FIG. 3, method 300 may further involve receiving depth data from a depth sensor on the mobile robotic device, according to an example embodiment. In some examples, the depth sensor may be a stereo sensor that includes at least two imaging elements separated by a known offset. Depth data from the stereo sensor may include distance measurements to points on detected surfaces within the environment, where the distance measurements are determined by cross correlating matching features between images taken by each of the imaging elements. Based on the position and orientation of the stereo sensor on the mobile robot, the locations of detected points relative to the robotic device may also be determined from the stereo sensor data. In further examples, the depth sensor may be a different type of depth sensor as well, such as a lidar sensor.

In some examples, a depth sensor may be oriented on the robotic device to point in the direction of travel of the robotic device. The range of the depth sensor may include part of the ground in front of the robot. For instance, a stereo camera may be mounted on the front of an AGV midway between the two front wheels of the AGV. In some examples, the stereo sensor may be oriented parallel to a ground surface. In other examples, the stereo sensor may be oriented downward by a certain angle (e.g., 30 degrees below parallel) in order to detect a portion of the ground surface close to the robot. In additional examples, the orientation of the stereo sensor may be adjustable. For instance, the stereo camera may be oriented to point in the direction that an AGV is going to turn before the AGV starts to make the turn.

FIGS. 4A and 4B illustrate examples of a stereo sensor on a mobile robot oriented in a direction of travel of the robot, according to an example embodiment. More specifically, stereo sensor 402 may be mounted on the front end of robotic device 400 and oriented in direction of travel 404. In some examples, a robotic device may include more than one stereo sensor as well. A stereo sensor may be comprised of two or more optical elements collectively configured to map out a 3D representation of a scene. The two or more optical elements of a stereo sensor may be installed as a single device, as shown in FIGS. 4A and 4B. In other examples, the two or more optical elements of a stereo sensor may also be independent optical elements not housed in a single device that operate jointly as a stereo sensor. Stereo sensors with two optical elements may use the optical elements to measure the distance to objects in a scene by taking images of the scene from at least two respective viewpoints. Images from each optical element are then correlated to find possible corresponding features in the scene. After matches of corresponding features are determined, the distances to detected objects may be calculated.

Referring back to FIG. 3, method 300 may further involve identifying a portion of the depth data representative of the target area of the ground plane in the environment in front of the mobile robotic device, as shown by block 306. For instance, matching features within images captured by each optical element of a stereo sensor may be identified to determine locations of detected points on surfaces in the environment relative to the robotic device. Any points with locations that correspond to the expected location of the target area of the ground plane may be identified as belonging to a portion of the depth data representing the target area. In some examples, it may be assumed that the ground plane is a flat surface. Accordingly, detected points representing the ground plane may be identified as any points having the same Z height as part of the robot in contact with the ground (e.g., the bottoms of the wheels), or within a threshold amount of that Z height. In other examples, prior knowledge of the ground plane may be used to help determine which detected points represent the ground plane (e.g., the robot may be provided with predetermined information that the floor of a warehouse slopes up or down at particular points).

Figure 4C:
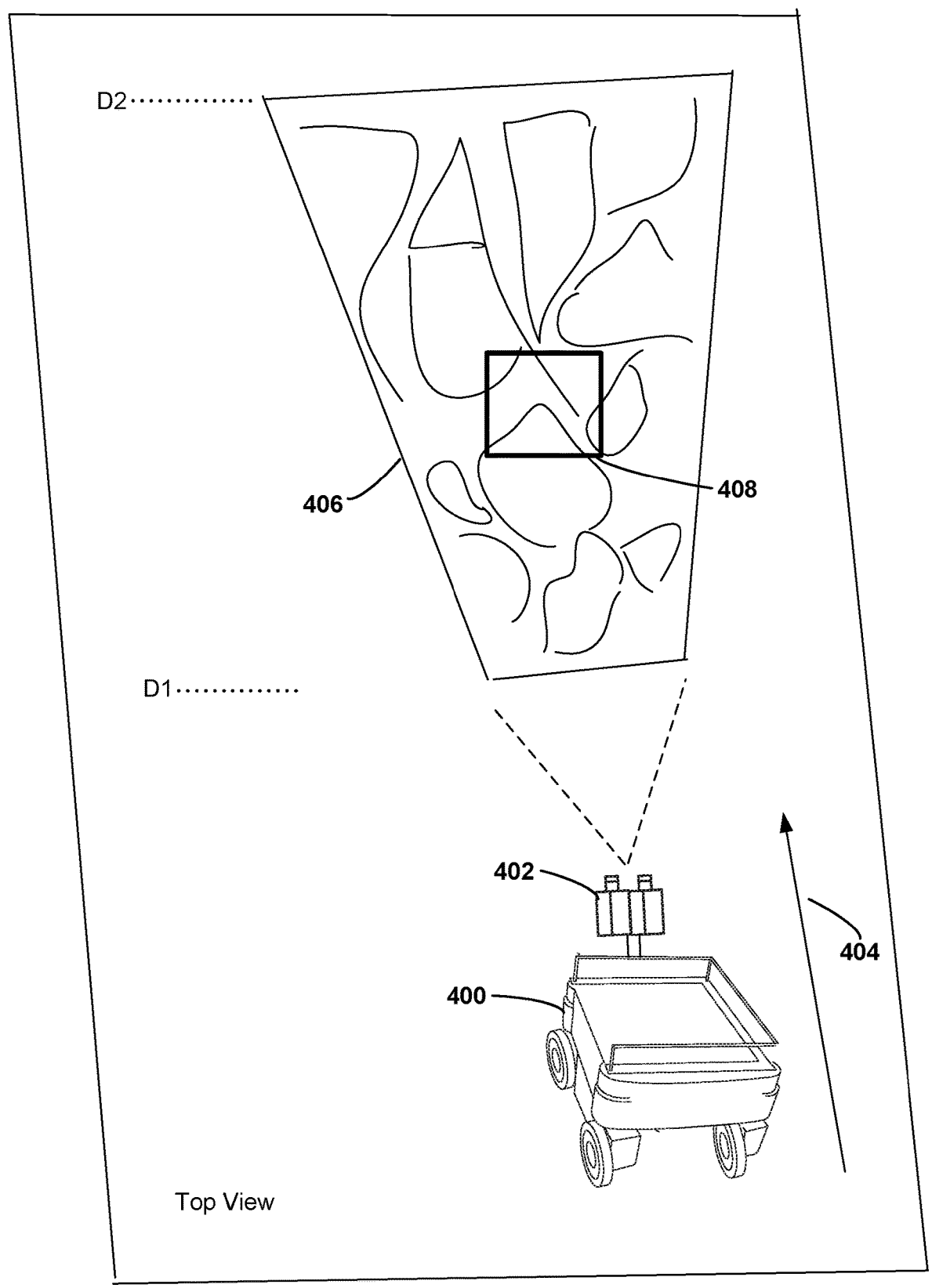
FIG. 4C illustrates an example of detection of a target area on a ground plane, according to an example embodiment.

FIG. 4C illustrates an example of detection of a target area on a ground plane, according to an example embodiment. More specifically, detected points within the depth data captured by stereo sensor 402 may be identified as corresponding to the target area 406 of the ground plane that robot 400 is traveling on. The target area 406 may be assumed to have a uniform Z height in some examples. The target area 406 may be assumed to have a uniform slope in other examples (e.g., if the ground plane tilts up or down). In order to determine distances to points in the environment, including points on the ground plane, the stereo camera 402 may identify matching features within images captured by each of the stereo camera's optical elements. Within examples, matching features for the ground plane may include any visible textures or patterns, including lines, shapes, cracks, discolorations, etc.

In reference to FIG. 4C, in one example embodiment, block 408 may be matched between images captured by each optical element of stereo camera 402. In particular, block 408 may contain some pattern of detectable features on the ground surface. The pattern may be located within images from both optical elements of stereo camera 402 in order to triangulate the distance from stereo camera 402 to block 408. A depth value indicating the location of block 408 within the environment may then be determined using the stereo camera 402. If the depth value associated with block 408 corresponds to an expected depth value of the ground surface within target area 406, then the system may determine that the portion of the target area 406 covered by block 408 has been verified as included within detected stereo sensor data. Block 408 is provided for purposes of illustration. In other examples, different size blocks may be used for block matching. In additional examples, stereo cross correlation may be done using different methods instead of block matching as well.

Figure 4D:
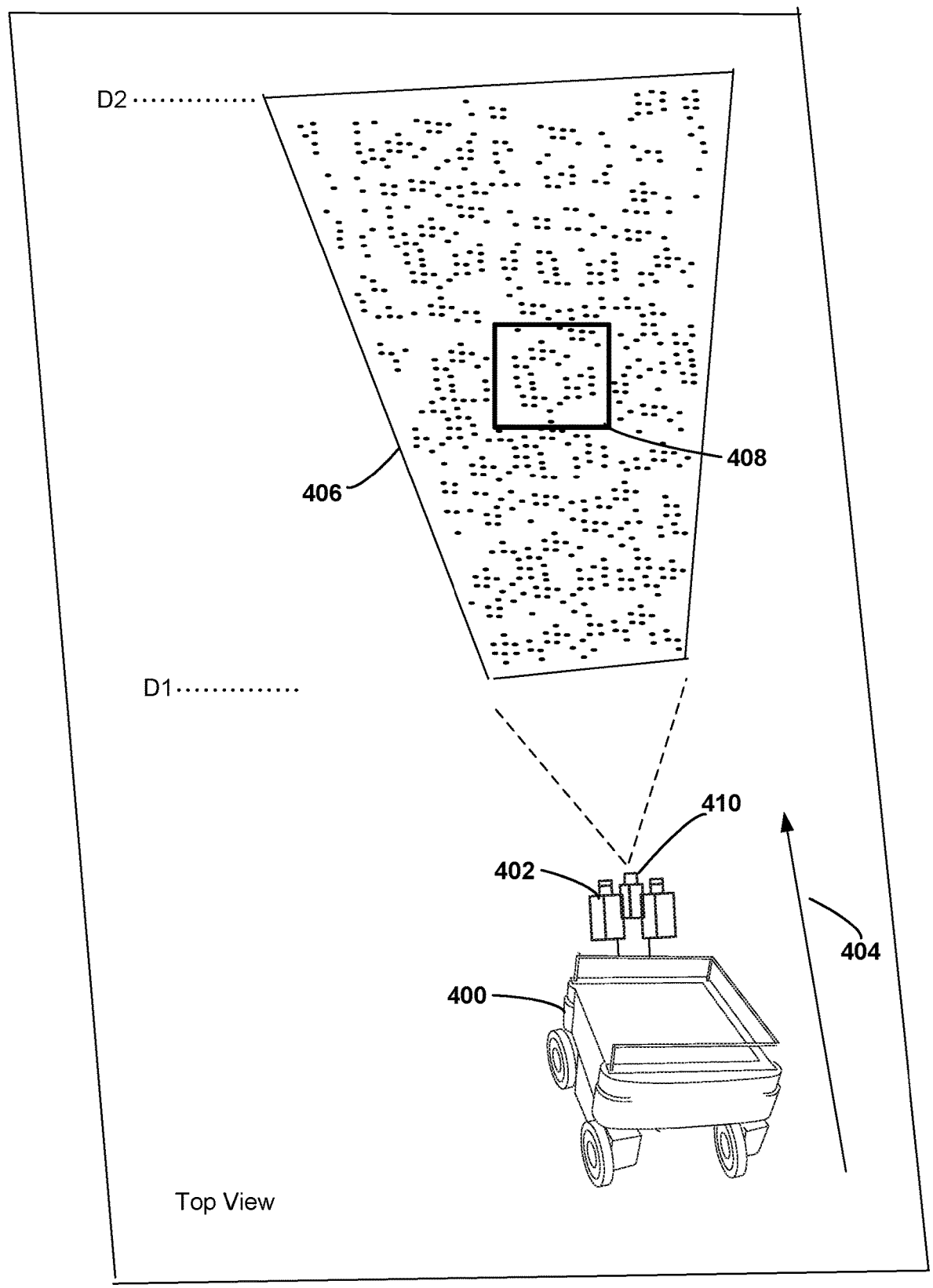
FIG. 4D illustrates another example of detection of a target area on a ground plane, according to an example embodiment.

FIG. 4D illustrates another example of detection of a target area on a ground plane, according to an example embodiment. More specifically, in some examples, a mobile robotic device 400 may additionally include a texture projector 410 that projects a texture pattern toward the target area 406 of the ground plane in front of the robot. The projected pattern may be detected by the stereo sensor 402 on the robot 400, which may be helpful in situations where the ground plane may lack sufficient texture for stereo cross correlation. In some examples, the projected pattern may be a known pattern used in combination with one or both optical elements of stereo sensor 402 for structured light processing to detect the ground plane. In other examples, the projected pattern may be a pseudo-random pattern that cycles through several non-repeating light patterns over a segment of time. In either case, the projected light patterns may be detected separately by each optical element of stereo sensor 402 and matched to determine depth of the detected ground plane.

In some examples, projected patterns from texture projector 410 may be used in conjunction with stereo block matching to locate the ground plane within the environment of robot 400. For instance, block 408 containing a particular pattern of projected light dots may be located within images captured by each optical element of stereo sensor 402 from their respective points of view. The distance to block 408 from stereo sensor 402 may then be determined by triangulation in order to verify that a particular section of target area 406 corresponding to block 408 is visible by stereo sensor 402.

Referring back to FIG. 3, method 300 further involves determining that the portion of the depth data identified in block 306 lacks information representing at least one section of the target area of the ground plane, as shown by block 308. For example, stereo matching may be performed to verify that depth data from a stereo sensor on a mobile robot contains information for detected points over an expected location of the target area of the ground plane. In some examples, part or all of the target area may not be included within the depth data. In particular, at least one contiguous section of the target area may be invisible to the stereo sensor. For instance, depth data from a stereo sensor may lack information representing at least one section of the ground plane in situations where an obstacle is obscuring the ground plane from view by the stereo sensor or in situations where the stereo sensor is not functioning properly (e.g., due to poor lighting).

Method 300 further involves providing an output signal identifying at least one zone of non-traversable space for the mobile robotic device in the environment, as shown by block 310. More specifically, a zone of non-traversable space is a volume of space that the robot is prevented from navigating through. In some examples, a safety system may send a warning signal to a separate control system of the robot to prevent the robot from traveling through identified zones of non-traversable space. In other examples, the safety system may be integrated with the control system to directly modify the robot's navigation to avoid the identified zones of non-traversable space by stopping or navigating around the zones.

The zones of non-traversable space for the robotic device may correspond to sections of the target area of the ground plane which are not included within the detected depth data. For instance, a zone of non-traversable space may be the volume of space directly above a section of the target area which is invisible to a stereo camera on the robot. In other examples, the zone of non-traversable space may include some predetermined extra buffer that extends beyond the invisible section of the target area of the ground plane. In further examples, when a section of the target area is not included within the depth data, the entire target area may be identified as a zone of non-traversable space for the robot.

Within examples, a safety system may send a warning signal or the robot's navigation behavior may be modified when at least one section of the target area is identified to be invisible to the depth sensor. In some examples, the safety system may only react when the section of the ground plane is greater than a threshold size (e.g., 2 square feet) to account for imperfection in depth detection (e.g., in performing stereo matching). The threshold size may also be adjusted based on how far away from the robot the invisible section of the target area is. For instance, a larger threshold size may be used for sections further away from the robot to account for a stereo sensor having decreased precision at further distances.

Figure 5A:
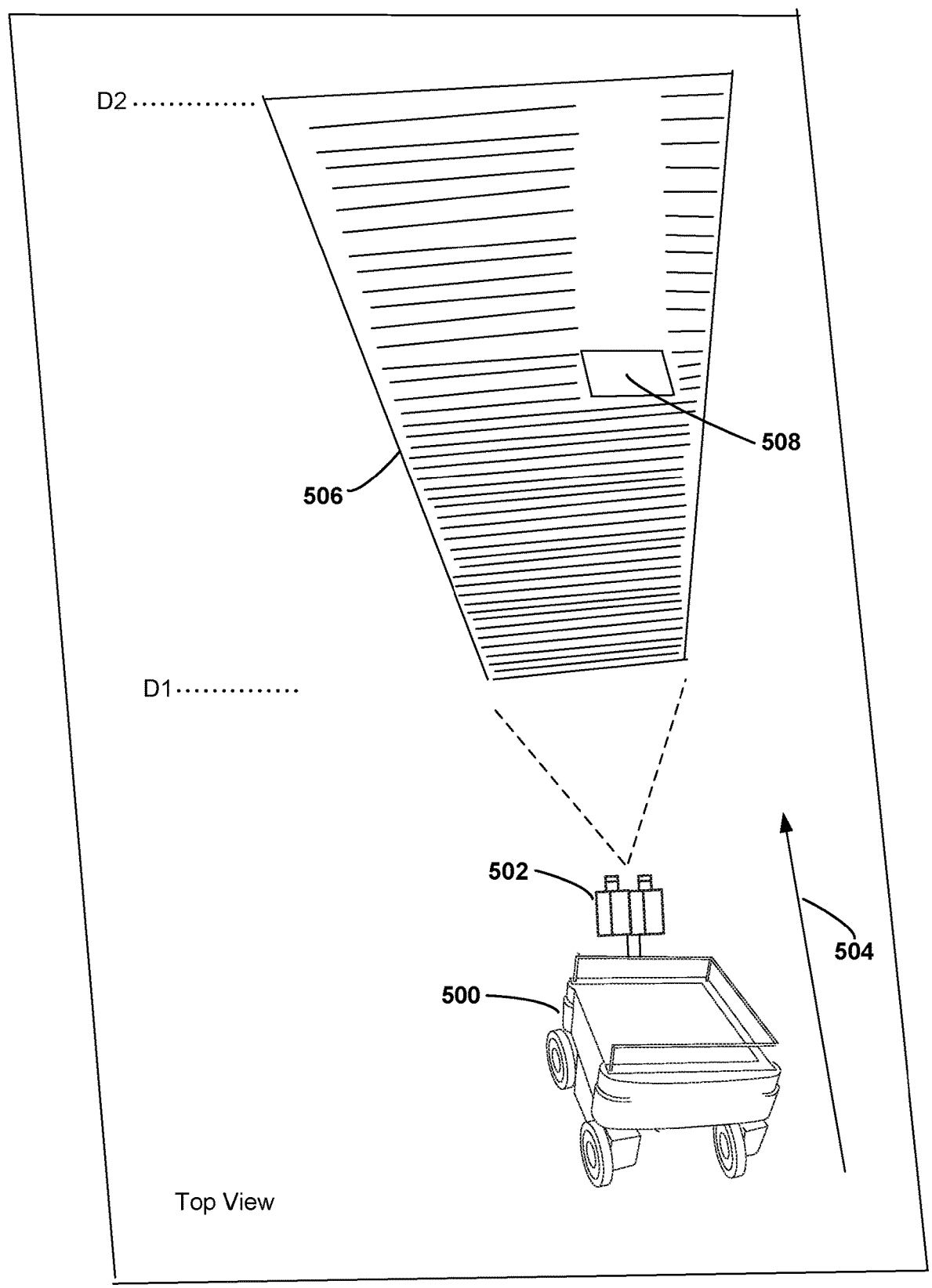
FIG. 5A illustrates an example of depth data representing a portion of a target area, according to an example embodiment.

FIG. 5A illustrates an example of depth data representing a portion of a target area, according to an example embodiment. More specifically, stereo sensor 502 on mobile robot 500 may detect surfaces within the environment in direction of travel 504 of the robot 500. A target area 506 may be determined in order to verify the status of the stereo camera 502 to be used as a safety sensor. In particular target area 506 may have a length that extends from D1 to D2, and may have a width that expands moving away from the robot 500. An expected location of target area 506 relative to the robot 500 and stereo sensor 502 may be determined based on an assumption that the ground plane is flat as it extends through the target area.

As shown in FIG. 5A, a certain part of the target area 506 may then be represented by the depth data, illustrated here as the part covered with horizontal lines. More specifically, the stereo sensor may therefore have detected points on a surface in the environment with depths that correspond to expected depths of points on the covered part of target area 506 of the ground plane. Additionally, a different part of the target area 506 may not be represented by the depth data, illustrated here as the part behind an object 508 which is not covered with horizontal lines. More specifically, the depth data may therefore lack detected points on a surface in the environment that correspond to expected depths of points on the uncovered part of target area 506 of the ground plane. In this example, the object 508 may be obscuring part of the target area 506 from view by stereo sensor 502.

In the example illustrated in FIG. 5A, a zone of non-traversable space for robot 500 may be determined based on the part of the target area 506 of the ground plane that is blocked by object 508 and not visible within depth data detected by stereo sensor 502. For example, the zone of non-traversable space may be the volume of space above the section of the target area 506 that does not contain horizontal lines (e.g., including object 508 and the space behind it). In such a scenario, the robot 500 may be commanded to steer to the left to travel around the zone of non-traversable space. In another example, the entire target area 506 may be identified as a zone of non-traversable space based on the invisible section, in which case the robot 500 may be commanded to stop or turn around.

Figure 5B:
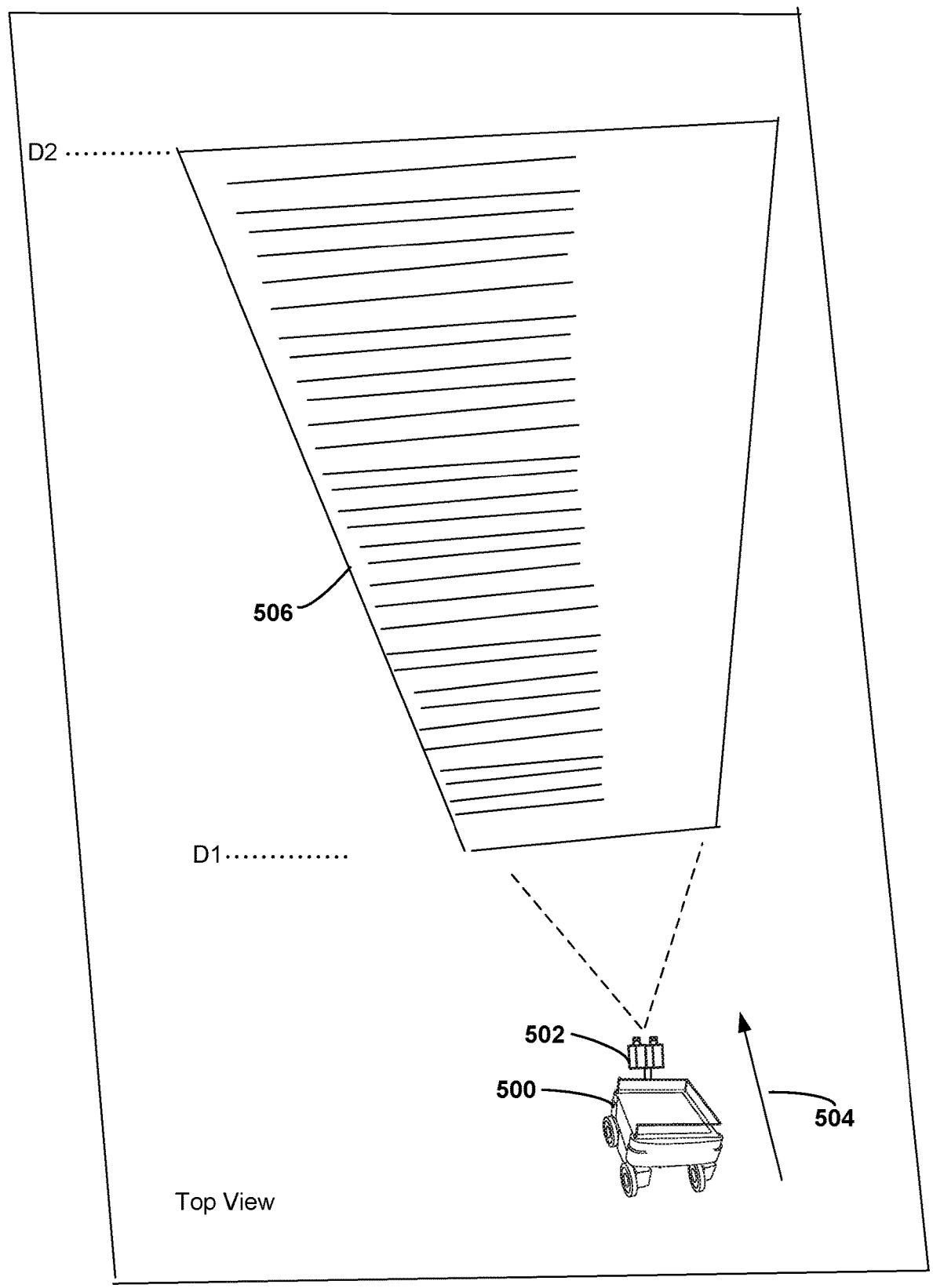
FIG. 5B illustrates another example of depth data representing a portion of a target area, according to an example embodiment.

FIG. 5B illustrates another example of depth data representing a portion of a target area, according to an example embodiment. More specifically, a section of target area 506 detectable by stereo sensor 502 of mobile robot 500 is represented here as the part on the left side that contains horizontal lines. Additionally, a section of target area 506 which is not detectable by stereo sensor 502 of mobile robot 500 is represented as the part on the right side that does not contain horizontal lines. In some examples, the robot 500 may not be able to determine the cause of the invisible section of the target area 506 of the ground plane while navigating within the environment. For instance, an obstacle may be obscuring the view of the stereo sensor 502, the environment above the right side of the target area 506 may contain insufficient lighting for stereo reconstruction, or the surface of the ground on the right side of the target area 506 may lack sufficient texture for stereo matching.

Regardless of the exact cause, a zone of non-traversable space for robot 500 may be identified corresponding to the right side of target area 506. For instance, the zone of non-traversable space may be a volume of space within the environment above the section of target area 506 that does not contain horizontal lines. In such an example, the robot 500 may be commanded to steer to the left. In other examples, the zone of non-traversable space may be determined to be the entire target area 506 based on the size and location of the invisible section of the target area 506 of the ground plane, in which case the robot 500 may be commanded to stop or turn around.

Figure 5C:
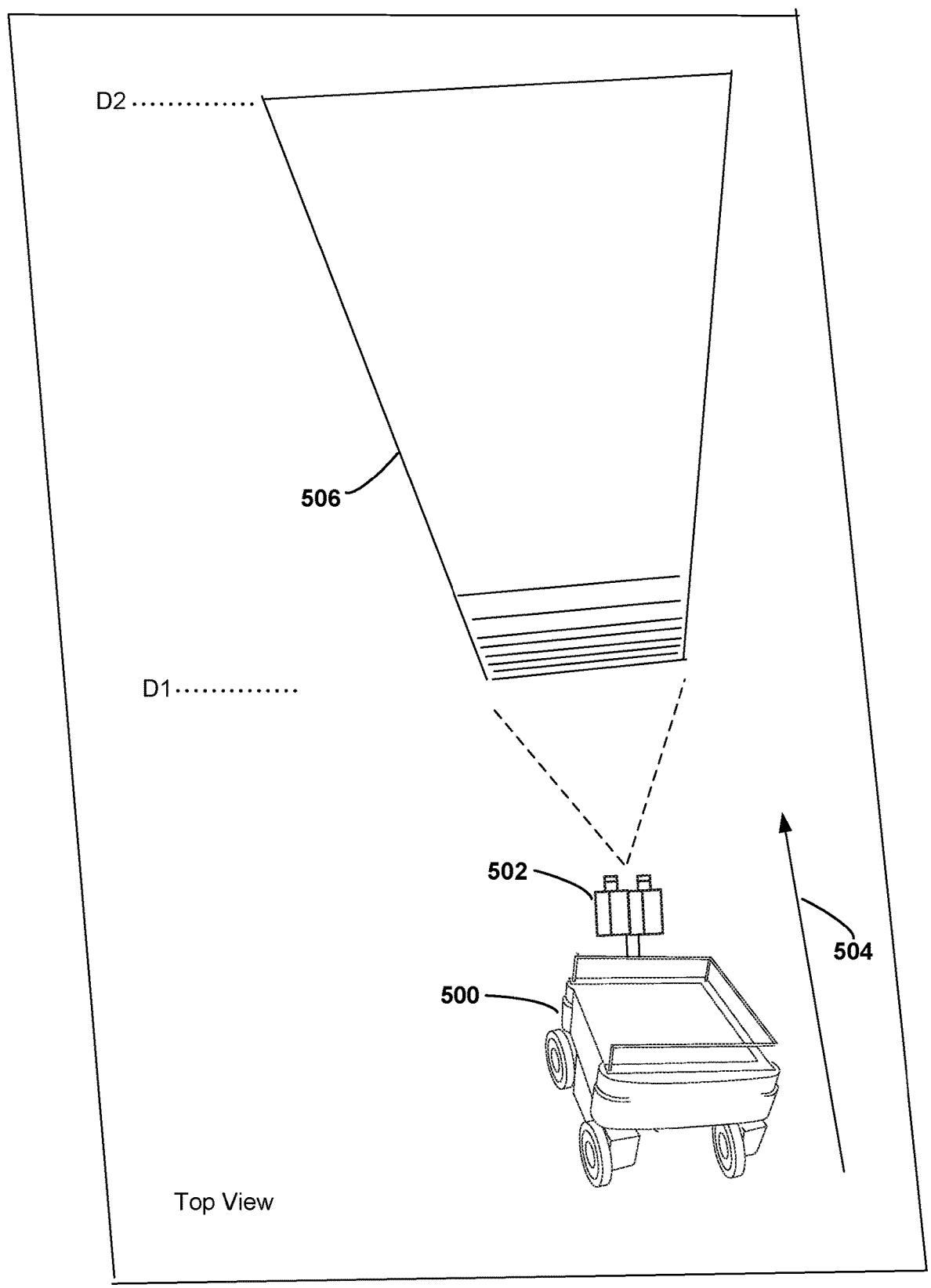
FIG. 5C illustrates a further of depth data representing a portion of a target area, according to an example embodiment.

FIG. 5C illustrates a further example of depth data representing a portion of a target area, according to an example embodiment. More specifically, a section of target area 506 detectable by stereo sensor 502 of mobile robot 500 is illustrated here as the part in the front that contains horizontal lines. Additionally, a section of target area 506 which is not detectable by stereo sensor 502 of mobile robot 500 is illustrated as the rest of the target area 506 that does not contain horizontal lines. A zone of non-traversable space for robot 500 may be identified corresponding to the invisible section of target area 506. For instance, the zone of non-traversable space may be a volume of space within the environment above the section of target area 506 that does not contain horizontal lines. In such an example, the robot 500 may be controlled to reduce speed and continue forward to see if detection of target area 506 improves as the stereo sensor 502 gets closer. In other examples, the zone of non-traversable space may be determined to be the entire target area 506 based on the size and location of the invisible section of the target area 506 of the ground plane, in which case the robot 500 may be commanded to stop or turn around.

According to further examples, the target area used for depth sensor verification may be adjusted dynamically based on one or more factors. In one example, a safety system of the robot may receive information indicating a current speed of the robot from one or more speed sensors. The safety system may then determine the size of the target area based on the current speed of the robot. For instance, the target area may extend further from the robot when the robot is moving faster, and may extend less far when the robot slows down. This example system may reduce unnecessary processing when the robot is not moving fast or stopped, while still providing sufficient range for safe operation when the robot is moving faster. In an additional example, the length of the target area extending away from the robot may be determined based on the speed of the robot and the width of the target area may be determined based on a current steering orientation of the robot.

In a further example, the safety system may adjust the frequency at which the target area is verified in order to identify any zones of non-traversable space based on one or more factors. For instance, the frequency may be adjusted based on the speed of the robot. When the robot is moving faster, more frequent verification may be performed. Unnecessary processing may be avoided by reducing the frequency of verification (e.g., stereo matching) when the robot slows down or stops.

In another example, the safety system may receive navigation instructions for the robot from a control system of the robot. The navigation instructions may indicate planned future directions of travel for the robot (e.g., for the next ten seconds). The safety system may then determine the target area to accommodate the navigation instructions. For instance, if the robot is planning to turn right, the target area may extend further to the right. In some examples, the depth sensor on the robot may also be reoriented based on the navigation instructions.

In further examples, when the robot includes a texture projector as previously described, a safety system of the robot may separately determine when the projected texture pattern failed to reach a portion of the target area of the ground plane. For instance, a stereo sensor may recognize a portion of the ground plane that does not contain the expected texture pattern. In some examples, sections of the target area not reached by the projected texture pattern may be used to identify additional corresponding zones of non-traversable space for the robot. For instance, the corresponding zones may be located above the sections not reached by the texture pattern. Such an example system may be beneficial to identify situations where the texture projector is not working properly or is obscured by an unexpected obstacle.

Within examples, a safety system which uses methods of ground plane verification as described herein may be used in conjunction with a number of other types of methods for object detection. In particular, one or more other methods may be used to detect objects above ground (e.g., to ensure that overhanging obstacles are detected). Once it is verified that the depth sensor can see the target area of the ground plane, data from the depth sensor indicative of other objects above the ground plane may be used within one or more other methods to detect objects above ground.

In a further example, a stereo camera may be used in conjunction with a plurality of laser rangefinders that are configured to detect objects directly in front of the robot. For instance, five laser distance sensors that project respective narrow laser beams and detect reflected laser beams may be spaced out in a horizontal row across the front of the robot to detect objects at least up to a distance where the range of the stereo sensor begins. Such an example system may be used to account for a stereo sensor that cannot detect objects at short ranges.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving a motion parameter for a mobile robotic device that is travelling on a ground plane in an environment;
based on the motion parameter, causing a texture projector on the mobile robotic device to project a texture pattern onto a target area of the ground plane for verification by a depth sensor on the mobile robotic device, wherein the target area has a first width at a first distance that is greater than a width of the mobile robotic device, and wherein the target area increases in width in a direction of travel of the mobile robotic device such that the target area allows for verification of a portion of the ground plane reachable by the mobile robotic device based on a steering orientation of the mobile robotic device;
receiving depth data from the depth sensor;
identifying a portion of the depth data representative of the texture pattern projected by the texture projector onto the target area of the ground plane;
determining that the portion of the depth data lacks information representing a section of the target area of the ground plane; and
controlling the mobile robotic device to avoid a zone of non-traversable space for the mobile robotic device in the environment, wherein the zone of non-traversable space corresponds to the section of the target area of the ground plane.

2. The method of claim 1, wherein the depth sensor is a stereo sensor that determines the depth data by locating matching features between images captured by two or more optical elements.

3. The method of claim 1, wherein the motion parameter comprises speed data indicative of a current speed of the mobile robotic device, the method further comprising:
determining a second distance for the target area of the ground plane based on the current speed of the mobile robotic device.

4. The method of claim 1, wherein the motion parameter comprises speed data indicative of a current speed of the mobile robotic device, the method further comprising:
verifying that the depth data includes information representing the target area of the ground plane at a chosen time interval, wherein the chosen time interval is determined based on the current speed of the mobile robotic device.

5. The method of claim 1, wherein the motion parameter comprises speed data indicative of a current speed of the mobile robotic device, wherein the depth sensor is a stereo sensor, the method further comprising adjusting a rate at which stereo matching is performed using sensor data from the stereo sensor to verify that the target area of the ground plane is visible to the stereo sensor based on the current speed of the mobile robotic device.

6. The method of claim 1, wherein controlling the mobile robotic device comprises causing the mobile robotic device to stop moving in a direction of travel of the mobile robotic device based on the zone of non-traversable space.

7. The method of claim 1, further comprising:
determining that the section of the target area of the ground plane is above a threshold size, wherein controlling the mobile robotic device to avoid the zone of non-traversable space is performed in response to determining that the section is above the threshold size.

8. The method of claim 7, wherein the threshold size depends on a distance of the section of the target area of the ground plane from the mobile robotic device.

9. The method of claim 1, further comprising receiving navigation instructions indicative of planned future directions of travel for the mobile robotic device for a subsequent time period, the method further comprising determining the target area of the ground plane based on the navigation instructions.

10. A mobile robotic device, comprising:
a depth sensor on the mobile robotic device;
a texture projector on the mobile robotic device; and
a control system, comprising a processor, wherein the control system is configured to:
receive a motion parameter for the mobile robotic device when the mobile robotic device is travelling on a ground plane in an environment;
based on the motion parameter, cause the texture projector on the mobile robotic device to project a texture pattern onto a target area of the ground plane for verification by the depth sensor on the mobile robotic device, wherein the target area has a first width at a first distance that is greater than a width of the mobile robotic device, and wherein the target area increases in width in a direction of travel of the mobile robotic device such that the target area allows for verification of a portion of the ground plane reachable by the mobile robotic device based on a steering orientation of the mobile robotic device;
receive depth data from the depth sensor;
identify a portion of the depth data representative of the texture pattern projected by the texture projector onto the target area of the ground plane;
determine that the portion of the depth data lacks information representing a section of the target area of the ground plane; and
control the mobile robotic device to avoid a zone of non-traversable space for the mobile robotic device in the environment, wherein the zone of non-traversable space corresponds to the section of the target area of the ground plane.

11. The mobile robotic device of claim 10, further comprising a plurality of wheels for locomotion, wherein the motion parameter comprises orientation data indicative of a current steering orientation of the mobile robotic device.

12. The mobile robotic device of claim 10, wherein the depth sensor is a stereo sensor that determines the depth data by locating matching features between images captured by two or more optical elements, wherein the stereo sensor is oriented downward so that a field of view of the stereo sensor includes the target area of the ground plane.

13. The mobile robotic device of claim 12, wherein the control system is further configured to:
verify that the texture pattern is visible by the stereo sensor in a given portion of the target area of the ground plane before allowing the mobile robotic device to navigate over the given portion of the target area of the ground plane.

14. The mobile robotic device of claim 10, wherein the depth sensor is a lidar sensor, wherein the lidar sensor is oriented on the mobile robotic device so that a field of view of the lidar sensor includes the target area of the ground plane.

15. A non-transitory computer readable medium having stored therein instructions, that when executed by a control system, cause the control system to perform functions comprising:

receiving a motion parameter for a mobile robotic device that is travelling on a ground plane in an environment;

based on the motion parameter, causing a texture projector on the mobile robotic device to project a texture pattern onto a target area of the ground plane for verification by a depth sensor on the mobile robotic device, wherein the target area has a first width at a first distance that is greater than a width of the mobile robotic device, and wherein the target area increases in width in a direction of travel of the mobile robotic device such that the target area allows for verification of a portion of the ground plane reachable by the mobile robotic device based on a steering orientation of the mobile robotic device;

receiving depth data from the depth sensor;

identifying a portion of the depth data representative of the texture pattern projected by the texture projector onto the target area of the ground plane;

determining that the portion of the depth data lacks information representing a section of the target area of the ground plane; and controlling the mobile robotic device to avoid a zone of non-traversable space for the mobile robotic device in the environment, wherein the zone of non-traversable space corresponds to the section of the target area of the ground plane.

* * * * *